United States Patent

Cezanne et al.

[11] Patent Number: 5,251,969
[45] Date of Patent: Oct. 12, 1993

[54] BRAKE POWER CONTROLLER WITH ELECTRICALLY ACTUATED LOCKING APPARATUS

[75] Inventors: Rudolf Cezanne, Graevenwiesbach; Rudolph Heuer, Gifhorn/Wilsche, both of Fed. Rep. of Germany

[73] Assignee: Alfred Teves GmbH, Frankfurt am Main, Fed. Rep. of Germany

[21] Appl. No.: 859,410
[22] PCT Filed: Sep. 6, 1991
[86] PCT No.: PCT/EP91/01695
  § 371 Date: May 28, 1992
  § 102(e) Date: May 28, 1992
[87] PCT Pub. No.: WO92/05988
  PCT Pub. Date: Apr. 16, 1992

[30] Foreign Application Priority Data

Sep. 28, 1990 [DE] Fed. Rep. of Germany ....... 4030686

[51] Int. Cl.⁵ ..................... B60T 8/26; B60T 11/34
[52] U.S. Cl. ................... 303/963; 303/9.75; 303/113.5
[58] Field of Search ............ 303/9.63, 9.72, 9.75, 303/9.69, 9.62, 113 AP, 119 SV, 113.5, 119.2; 137/595, 596

[56] References Cited

U.S. PATENT DOCUMENTS 3,727,989  4/1973  Keady ........................... 303/9.63
4,472,000  9/1984  Leiber ........................... 303/9.75
4,982,999  1/1991  Rossigno et al. ............. 303/9.75 X
5,139,316  8/1992  Watanabe et al. ........... 303/113 AP

FOREIGN PATENT DOCUMENTS 2507323  8/1975  Fed. Rep. of Germany ..... 303/9.63

*Primary Examiner*—Matthew C. Graham
*Attorney, Agent, or Firm*—Robert P. Seitter; J. Gordon Lewis

[57] ABSTRACT

A brake pressure proportioning controller is described for the rear wheel brakes of an automotive vehicle with a brake unit equipped with an anti-locking control, the brake pressure controller being provided with a lockout arrangement in which an electromagnetic drive prevents the brake pressure controller from performing its pressure reducing function as long as the anti-locking control is functioning. The lockout arrangement includes an actuating element (6) which is axially slidable by the drive (1), an intermediate bushing (8) is formed with radial round holes (34, 34') in which interlocking ball elements (31, 31') are guided in radial directions which are thicker than the wall of the intermediate bushing (8) and which are normally retained by the actuating element (6) in a position in which they lock any axial movement of the control element (9) in the direction of the electromagnetic drive (1). In the event of an anti-locking control failure, actuating element (96) is slid axially such that it is capable of accommodating the interlocking elements (31, 31') in a radial recess (7) is released. The lockout arrangement is located outside the hydraulic brake circuit.

10 Claims, 1 Drawing Sheet

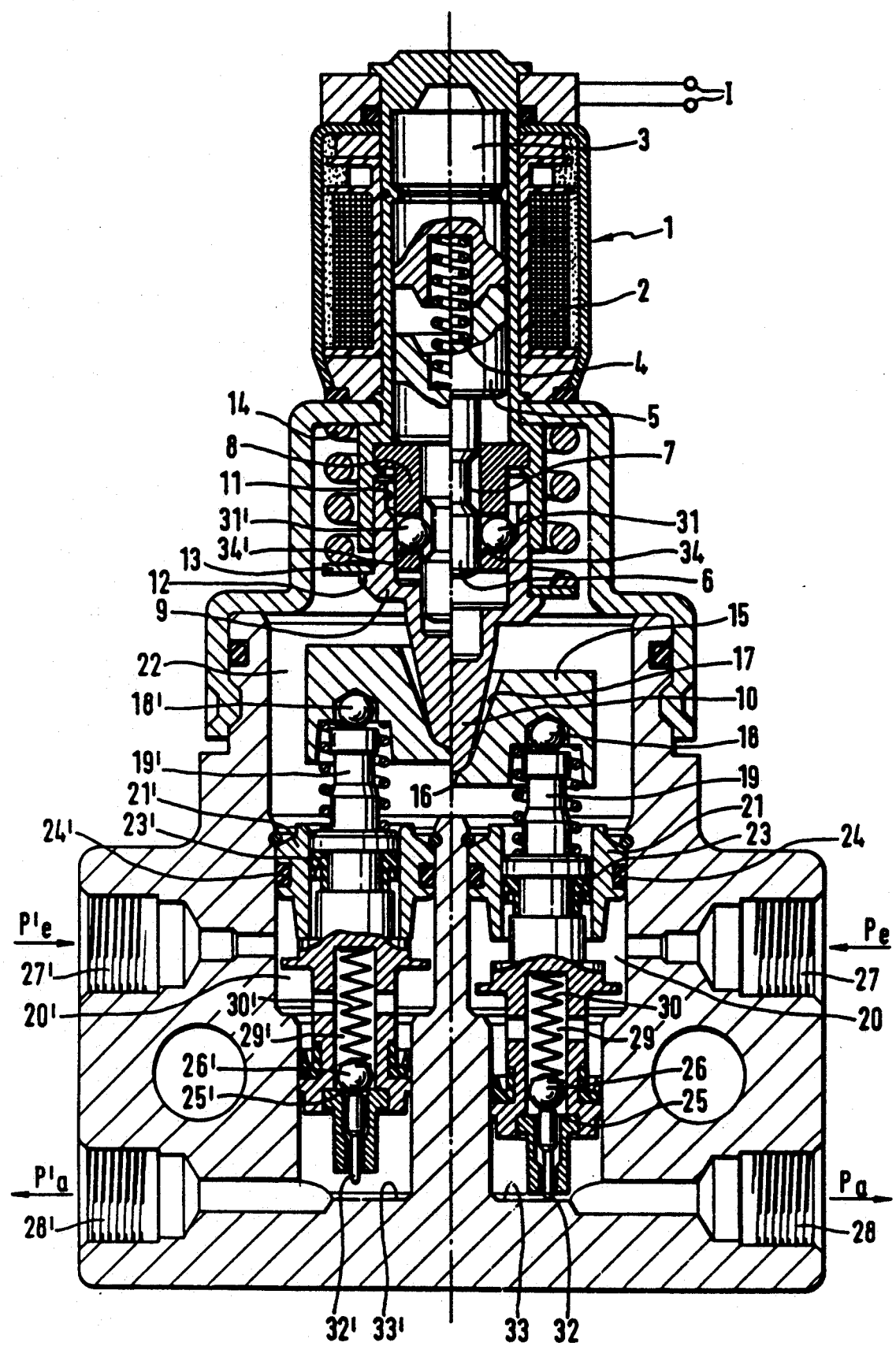

BRAKE POWER CONTROLLER WITH ELECTRICALLY ACTUATED LOCKING APPARATUS

BACKGROUND OF THE INVENTION

The invention is related to a rear brake pressure proportioning valve or controller having an electrically actuated lockout arrangement.

Various brake pressure proportioning valves or controllers have been proposed in which an electromagnetically moved tappet extends through an axial bore in a pressure control piston, keeping the closing member of the control valve spaced from its valve seat as long as the anti-locking control is operational. An increased degree of safety is attained by the additional incorporation of such a controller since the brake pressure acting on the rear wheels is thus reduced when the anti-locking control malfunctions.

Starting from this principle, the present invention has the object to create further functional improvements, in particular, low force actuation of the lockout arrangement. This is of the special importance in case of twin-type brake power controllers for a diagonal combination of the brake circuits in order to allow locking out and releasing both brake circuits by a single actuator.

SUMMARY OF THE INVENTION

This object is achieved by an electromagnetically driven locking pin normally held in an axially shifted lockout position intermediate radially movable locking elements. The locking elements are received in openings in a fixed member and engaged by a radially acting wedging surface on a spring urged valve actuator member, which prevents axial closing movement of the valve control piston, initially positioned in the open position, as long as locking pin is held in its shifted position. The locking pin is released when an antiskid control fails by deenergization of the electromagnetic drive, and radial movement of the locking elements is allowed, so that normal proportioning action occurs by closing movement of the valve control piston. Due to the exclusively radial locking direction, unlocking is enabled with small forces. Upon repair of the anti-locking control, the controller valve member is easily locked again, because the brake lines will then be unpressurized and the control piston shifted to the open position by a spring, the interlocking elements easily moved radially out by the locking pin to again engage the wedge surface of the valve actuating element.

This set-up of the lockout arrangement is suited especially well for twin-type controllers because an electromagnet in common furnishes sufficient force to lock both control units.

The change-over pressure of the controller may be set, as load dependently by substituting for the control spring which generates a fixed bias force which acts upon the valving control piston a load variable force generating mechanical, pneumatic, hydraulic or electromagnet means.

A solution which provides particularly reliable lock out operation is achieved by locating the components of the arrangement in a chamber outside the hydraulic control circuit. A sophisticated and expensive sealing of the lockout arrangement is thus not needed.

That is, in lieu of a direct actuation of valve closing members by means of a tappet—as proposed in past solutions—the control piston or control pistons are directly acted upon in the present invention, each control piston sealedly projecting out of its bore into a chamber housing the lockout arrangement, which chamber is free of pressure fluid.

If and when the anti-locking control fails during operation of the brakes, the full pressure will exist at the outlet since the controller is locked until then.

Although the control piston will immediately travel into its pressure reducing position, the output pressure already existing would lock the rear wheel brakes if it were not reduced. For this reason, an additional pressure reducing apparatus is expedient which brings about an increase of the volume of the outlet-side section of the bore when the valve in the control piston is closed. At the least, the stroke of the control piston in the unlocked condition should definitely be larger than the closing travel of the valve of the control piston to achieve the increased volume of the outlet side section of the bore.

Further advantageous features will be revealed by the following description of the preferred embodiment making reference to an accompanying drawing.

DESCRIPTION OF THE DRAWING

The Figure shows a twin-type brake power controller in partial section, with the right half of the Figure illustrating the position of the elements when the anti-locking control is properly functioning, and the left half of the Figure illustrating the positions assumed after failure of the anti-locking control.

DETAILED DESCRIPTION

The lockout arrangement of this controller includes an electromagnetic drive 1 including an electromagnetic coil 2 which is supplied with a control current I from an antilock control, and which surrounds the magnetic core 3, staked so as to be fixed to the housing. A magnetic armature 5 is subjected to the action of a compression spring 4 and is movable axially. The magnetic armature 5 is press fit to the actuating element 6 which is piston-shaped and is provided with a radial ring-shaped groove 7 with beveled edges. The actuating element 6 extends through the intermediate bushing 8 which is fixed to the housing. The bushing 8 is formed with two radial round holes 34 and 34' which are positioned opposite each other and in each of which a ball-shaped interlocking element 31, 31' is radially guided. The control element 9 has a cup-shaped configuration and is furnished with a control finger 10 at its bottom. The inside wall of the cup-shaped part of said control element 9 is provided with a tapered wedging extension step 11 toward the opening. The cup-shaped part of the control element 9 axially slidingly receives a part of the intermediate bushing 8.

The control element 9 is subject to a control force for the adjustment of the change-over pressure of the brake pressure controller. At the outside wall of the control element 9, the illustrated design version with a fixedly adjusted change-over pressure has a circumferential radial projection 12 which is subjected through the annular disc 13 to the force of the control spring 14. The control finger 10 is shaped as an acute-angled cone with a rounded tip 16 which acts upon the transmission element 15 by an abutment within a depression 17 of the transmission element 15. The depression also is configured as an acute-angled cone with rounded tip whose curvature is adapted to that of the tip 16 of the control finger 10 and whose apex angle is larger than that of the control finger 10.

Acting as a balance beam having its balance point at the tip 16 of the control finger 10, the control element 15 acts on each of two balls 18 and 18' and upon two associated control pistons 19 and 19'. The latter are each guided axially within respective stepped bores 20, 20' and project through the guide bushings 21 and 21' fixed to the housing, into the chamber 22 which is free of pressure fluid and contains the transmission element 15.

With the aid of the sealing sleeves 23 and 23', the control pistons 19 and 19' are sealed off in respect of the guide bushings 21, 21', which are themselves provided with sealing rings 24 and 24' to be sealed with respect to the walls of the bores 20, 20'.

At the ends of the control pistons 19 and 19' facing away from the actuating and locking apparatus, the valve seats 25 and 25' are positioned which interact with the respective closing members 26, 26'. The latter are each located within a cavity 29 or 29' within the lower end of the control pistons 19 and 19' and are subject to the action of the compression springs 30, 30' urging them in the direction of the valve seats 25, 25'. These valves form the only pressure fluid passage from the inlets 27 and 27' to the respective outlets 28, 28'.

For the explanation of the functioning of the invention, reference is made first of all to the right half of the Figure. In the initial position, the brake system is unpressurized, so that spring 14 shifts control element 9 to the fully down position shown. If the anti-locking control is operating normally, and control current I flows, the coil 2 holds the magnetic armature 5 up by the attraction of its magnetic field, against the force of the compression spring 4. The actuating element 6 is, therefore, held in an axial position in which it locks the interlocking ball elements 31, in a radially outward location such that they are held abutted against the wedging extension step 11 of the control element 9. Thus any axial movement of the control element 9 toward the drive 1 is positively prevented.

Acting through the transmission element 15 and the respective balls 18, 18', the control element 9 retains both control pistons 19 and 19' in a downward axial position in which the respective ball closing members 26, 26' are positioned above the valves seats 25, 25' because the tappets 32 and 32' are in abutment against the front walls 33, 33' of the bores 20 and 20', keeping the closing members 26 and 26' spaced from the valve seats 25 and 25'.

In this context, it is of importance that the control pistons 19 and 19' are not abutted against the front walls 33 and 33' in order that even with the controller locked out they are afforded a slight axial movement when the change-over pressure is reached. In this way it is safeguarded that the control pistons do not stick and remain operative, even though held in this position over a very extended period, as this is the normal condition.

In this locked position, the output pressure Pa equals the input pressure Pe.

The left half of the Figure shows the brake pressure controller in the pressure reducing position, that is to say, the anti-locking control has met with a failure, which failure causes a shut off of the electrical current I and the coil 2 is thus in the de-energized condition.

The actuating element 6 is slid by the compression spring 4 into a position in which the ring-shaped groove 7 can accommodate the interlocking elements 31 and 31' to such an extent that the axial slide of the control element 9 toward the drive 1 is unimpeded.

As soon as the change-over pressure set by the control spring 14 has been reached, the brake pressure controller starts its pressure reducing function. The control pistons 19 and 19', acted on by the pressure Pe' exerted on the larger diameter on the side of the spring 14, and by the pressure Pa' acting on the full area below the pistons 19, 19', will slide into the position illustrated in this left half of the Figure, so that the closing members 26 and 26' rest sealingly on the valve seats 25, respectively 25' because the control pistons 19 and 19' have traveled away from the front walls 33 and 33' and the tappets 32 and 32' are no longer abutted against the latter. As the input pressure Pe' rises further the control piston 19 and 19' will travel up and down in a rapid succession and will thereby reduce the output pressure Pa' to a proportion of the input pressure Pe'. The control pistons 19, 19' are seen to be shifted upward from the initial full down position with members 26, 26' fully open so that the volume of the section of the bores 20, 20' at the outlet 28 28' is increased to reduce the pressure Pa, Pa' when the anti lock control fails, as discussed above. A separate pressure reducing device can be used for this purpose, as also discussed above.

We claim:

1. A brake pressure proportioning controller to proportionately reduce the pressure to the rear wheel brakes of an automotive vehicle equipped with an anti-locking control, said brake pressure controller being provided with a lockout control arrangement which prevents the brake pressure controller from performing a pressure reducing function as long as said anti-locking control is functioning, said lockout arrangement including an electromagnetic actuator having a magnetic coil, with an electrical current flowing to energize said drive coil as long said wheel brake anti-locking control is functioning, said lockout arrangement further including an actuating element axially slidable by energizing of said coil to a locking position, said braking pressure controller including an axially shiftable control element axially moved during operation of said braking pressure controller, said lockout arrangement further including radially movable interlocking elements radially positively fixed when said actuator element is in said locking position, and radially released when said actuator element is released for axial movement when said coil is deenergized, and locking means causing axial locking of said control element when said interlocking elements are radially positively fixed and axially released when said locking elements are radially released.

2. A brake controller as claimed in claim 1, wherein said locking means includes an intermediate fixed bushing having a wall of predetermine thickness which is formed with at least two radial holes each receiving an interlocking element which is greater in a radial dimension than the thickness of said wall of said intermediate bushing, said interlocking elements retained therein in a fixed radial position by a portion of said actuating element, located adjacent said interlocking elements with sad actuating element in said locking position, in which condition said interlocking elements lock axial movement of said control element, and upon a failure of said anti-locking control, said actuating element, is slid axially and has a portion brought into alignment with said axial shift of said actuating element, said portion formed with a radial recess capable of accommodating radial movement of said interlocking elements, said axial movement of said control element released by radial movement of said interlocking elements into said radial recess.

3. A brake controller as claimed in claim 2, wherein said actuating element has a piston-shaped configuration and said control element surrounds said intermediate bushing and said actuating element, and said actuating element extends through said intermediate bushing.

4. A brake controller as claimed in claim 2, wherein said radial recess of said actuating element is formed by a circumferential groove with beveled edges.

5. A brake controller as claimed in claim 1, wherein said actuating element is connected to a magnetic armature surrounded by said coil which draws said magnetic armature into its magnetic field, and a compression spring acting on said armature opposing the force of said magnetic field.

6. A brake controller as claimed in claim 1, further including means imposing a control force on said control element, the magnitude of said force determining the reduction in pressure produced by said brake pressure controller.

7. A brake controller as claimed in claim 1, wherein said brake controller is a twin-type controller, and further including a transmission element acting on both brake pressure controllers, and in that said control element acts upon said transmission element.

8. A brake controller as claimed in claim 1, further including a housing having a chamber free of pressure fluid, at least one control piston, mounted in a stepped bore in said housing filled with pressure fluid, said control piston having one end located within said bore and another end projecting into said chamber, said one end of said control piston having a valve closing member and an aligned valve seat having an opening positioned within a cavity in said one end of said control piston, a compression spring carried by sad control piston urging said valve closing member toward said valve seat, a tappet abutted against said valve closing member, said tappet having one end projecting through said valve seat opening out of said one end of said control piston, an end wall of sad bore located to be engaged by said projecting one end of said tappet to move said valve closing member away from said valve seat to maintain said valve seat opening clear when said controller is locked.

9. A brake controller as claimed in claim 8, wherein said control piston is axially movable slightly when said controller is locked, said movement smaller than the extent of travel of said valve closing member required to be seated on said valve seat opening.

10. A brake controller as claimed in claim 8, wherein said bore is formed with an outlet-side section containing said one end of said control piston, means for reducing the outlet-side pressure within said section of said bore by an increase of the volume thereof when said anti-locking control fails.

* * * * *